US006450227B1

(12) United States Patent
Labardi

(10) Patent No.: US 6,450,227 B1
(45) Date of Patent: Sep. 17, 2002

(54) LABELS CHECK STATION, IN PARTICULAR AUTO-ADHESIVE LABELS, IN A LABELING MACHINE

(75) Inventor: Paolo Labardi, Borgo S. Lorenzo (IT)

(73) Assignee: Neri S.p.A., Firenze (IT)

( * ) Notice: Subject to any disclaimer, the term of this patent is extended or adjusted under 35 U.S.C. 154(b) by 152 days.

(21) Appl. No.: 09/625,566

(22) Filed: Jul. 26, 2000

(30) Foreign Application Priority Data

Jul. 27, 1999 (IT) ........................................ BO99A0419

(51) Int. Cl.[7] .......................... B32B 35/00; B32B 31/00

(52) U.S. Cl. ......................... 156/351; 156/378; 156/538; 156/584; 271/110; 271/111

(58) Field of Search .......................... 156/64, 344, 350, 156/351, 356, 357, 361, 362, 363, 378, 379, 540, 541, 584; 271/110, 111, 280, 281, 285, 286

(56) References Cited

U.S. PATENT DOCUMENTS 5,300,160 A * 4/1994 Wilson et al. ................ 156/64
5,405,482 A * 4/1995 Morrissette et al. ........ 156/364
5,478,428 A * 12/1995 Carpenter ................... 156/344
5,730,816 A * 3/1998 Murphy ....................... 156/64

* cited by examiner

*Primary Examiner*—Richard Crispino
*Assistant Examiner*—Sue A. Purvis
(74) *Attorney, Agent, or Firm*—William J. Sapone; Coleman Sudol Sapone, P.C.

(57) ABSTRACT

A station for checking labels, in particular auto-adhesive labels, in a labeling machine, cooperates with a control unit and has a working group for removing defective labels from a label carrier band. The working group has a knurled roller idling on a rotation axis and disposed inside a related windowed casing freely supported by an axle of the knurled roller. The windowed casing has a vertical plate with upstream and downstream edges. A tightening roller, also idling on a rotation axis, guides the band in cooperation with the adjacent working group, while a collecting group cooperates with the working group for collecting defective labels removed from the band. The windowed casing is operated, on command from the control unit, by an actuator and moves from a rest configuration, with the band completely guided by the knurled roller and tightening roller, to a working configuration, with the band engaged by the downstream edge of the plate.

10 Claims, 4 Drawing Sheets

LABELS CHECK STATION, IN PARTICULAR AUTO-ADHESIVE LABELS, IN A LABELING MACHINE

TECHNICAL FIELD

The present invention relates to labeling machines, particularly to a station for checking and verifying labels, specially auto adhesive ones.

BACKGROUND OF THE INVENTION

Traditional labeling machines apply labels to articles of different kind, e.g. bottles and/or vials, previously sealed. The labels precisely describe the product contained in the bottles or vials, giving basic information about the product, such as the product composition, packaging date and expiry date, etc.

The bottles and/or vials are kept in magazines situated upstream of the labeling machine and are collected downstream thereof by suitable conveying means.

Each labeling machine is equipped with a device, which checks both the type and the presence of the label by a contemporary check of printing and bar code on the same.

Consequently, when the check device detects a missing or defective label, the corresponding bottle and/or vial is rejected downstream of the machine, with or without the defective label having been applied.

When the device detects a missing label on the label carrying band, the related rejected bottle and/or vial can be collected, so as to be recycled into the machine process.

The economic advantage depends strictly on the type of product contained in the bottle and/or vial.

When the device detects a defective label, the rejected bottle and/or vial cannot be recovered, and consequently, it cannot be recycled into the machine process.

This is impossible due to too much labor needed to remove the non suitable label from the relative bottle and/or vial, as well as to a strong possibility of confusion about the precise content of the bottle and/or vial.

SUMMARY OF THE INVENTION

The object of the present invention is to propose a check station for labels, in particular auto adhesive labels, for a labeling machine, which detects defective labels and withdraws them from the relative carrying band, so as to allow a complete recycling of the rejected articles.

Another object of the present invention is to propose a station obtained by a simple, cheap, extremely reliable and practical technical solution, which optimizes the working cycle of the labeling machine.

The above mentioned objects are obtained, in accordance with the claims, by a station for checking labels, in particular auto adhesive labels, in a labeling machine, said station co-operating with a first sensor, located upstream of the station for checking the presence of said labels, and with a check group, also located upstream for verifying the acceptability of said labels, and with a second sensor, located downstream of said station for checking again the presence of said labels, with said sensors and check group being connected to a station control unit, and with said labels being attached to a band driven upstream and downstream of said station in accordance with a same forward direction, said labels check station further including:

a working group capable of removing damaged labels from said band, said working group including a operative roller, having vertical axis and idling on an axle, supported by a base contained with a clearance within a related cylindrical shaped windowed casing which is freely supported by said axle of said operative roller, said windowed casing featuring at one side a vertical plate having an upstream edge and a downstream edge, said operative roller and vertical plate delimiting an interspace through which said band passes while resting on said operative roller;

a tightening roller, idling on an axis, carried by said base for guiding said belt, said tightening roller co-operating with said working group and being located downstream of said working group with respect to said forward direction of said band;

one collecting group supported by the same base and co-operating with said working group for collecting defective auto-adhesive labels removed from said band by said working group;

said windowed casing being operated on command of said control unit, in phase relation with the detection of a defective label, by said check group with the aid of a related actuator means, from a rest configuration, in which the related plate is substantially parallel to said forward direction, with the band completely guided by said operative roller and tightening roller, to a working configuration, in which said plate is substantially perpendicular to said forward direction, with the band engaged by said downstream edge of said plate so as to remove said defective label due to the sharp variation of the tangent of the band trajectory.

BRIEF DESCRIPTION OF THE DRAWINGS

The characteristic features of the present invention will be pointed out in the following description of a preferred, but not only embodiment, with reference to the enclosed drawings, in which.

DESCRIPTION OF THE PREFERRED EMBODIMENT

Figure 1:
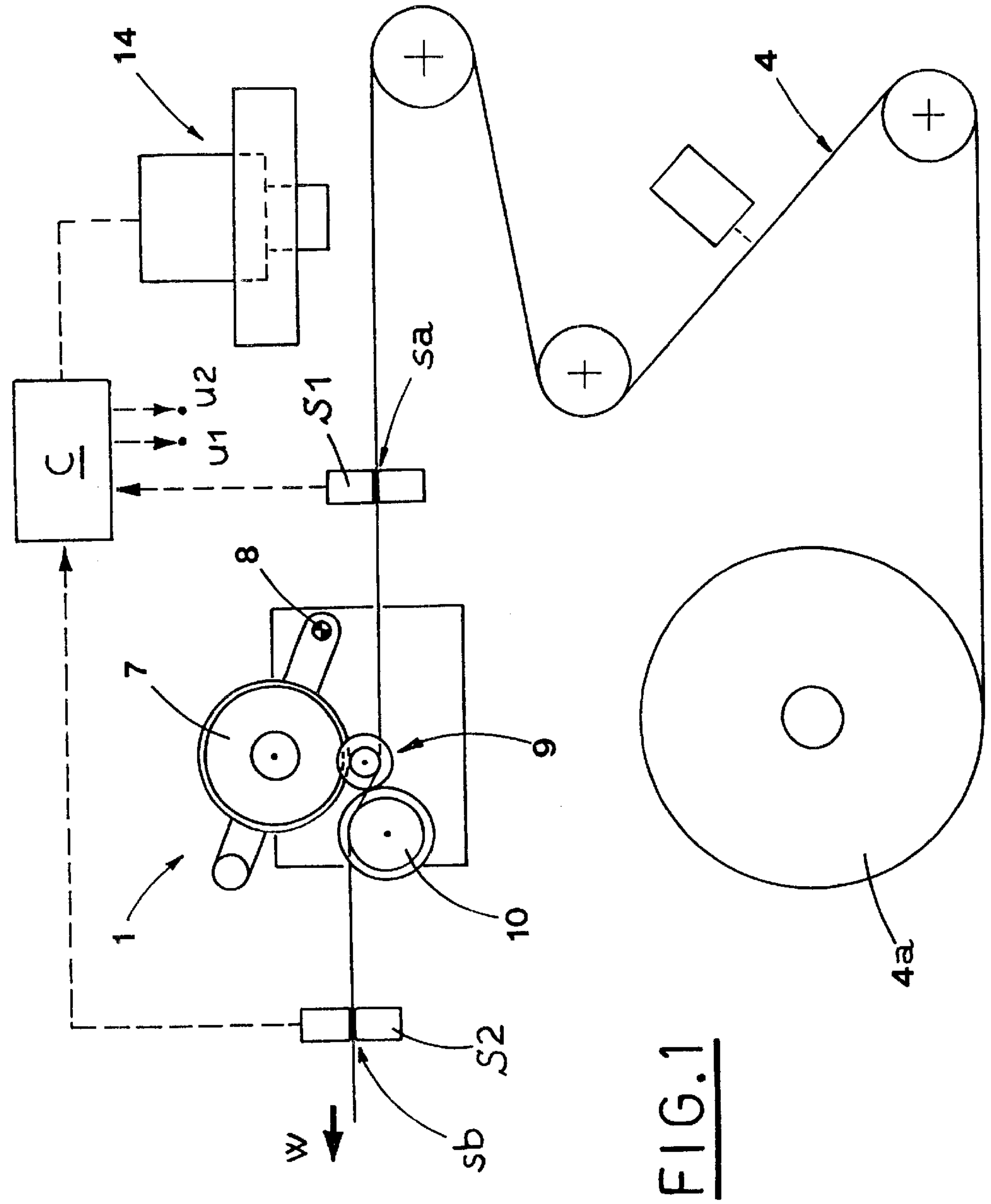
FIG. 1 is a schematic plan view of the proposed station.

With reference to the above described drawings, reference numeral 1 indicates the proposed station for checking auto adhesive labels 3, carried by a band 4, which is wound on a bobbin 4*a*, and driven in known way in a direction W, upstream and downstream of the station 1.

Upstream, the station 1 cooperates with a check group 14, e.g. videocamera, and downstream, with a first sensor S1, which detects the presence of labels 3.

Downstream, the station 1 there is also with a second sensor S2, also aimed at detecting the presence of the labels 3.

The first sensor S1 and the second sensor S2, forming narrow slots, respectively sa, sb, through which the band 4 passes, detect the presence of the label 3, while the videocamera 14 controls the code and printing made on the label 3.

The information gained by the sensors S1 and S2 and videocamera 14 are processed by a central unit C, which controls the proposed check station 1.

The station 1, substantially carried by a moving carriage 5, includes essentially a working group 9, which works in cooperation with a tightening roller 10, idling on its axis and guiding the band 4, and with a collecting group 70, which collects the labels 3 which must be removed from the band 4.

The working group 9, controlled by the central unit C, includes a knurled roller 9*a*, having a vertical axis and supported by the carriage 5.

The knurled roller 9*a* is idle on its axis and is kept with a clearance in a casing 9*b*, which features a window 9*c* and which is freely supported by an axle of the knurled roller 9*a*.

Figure 4:
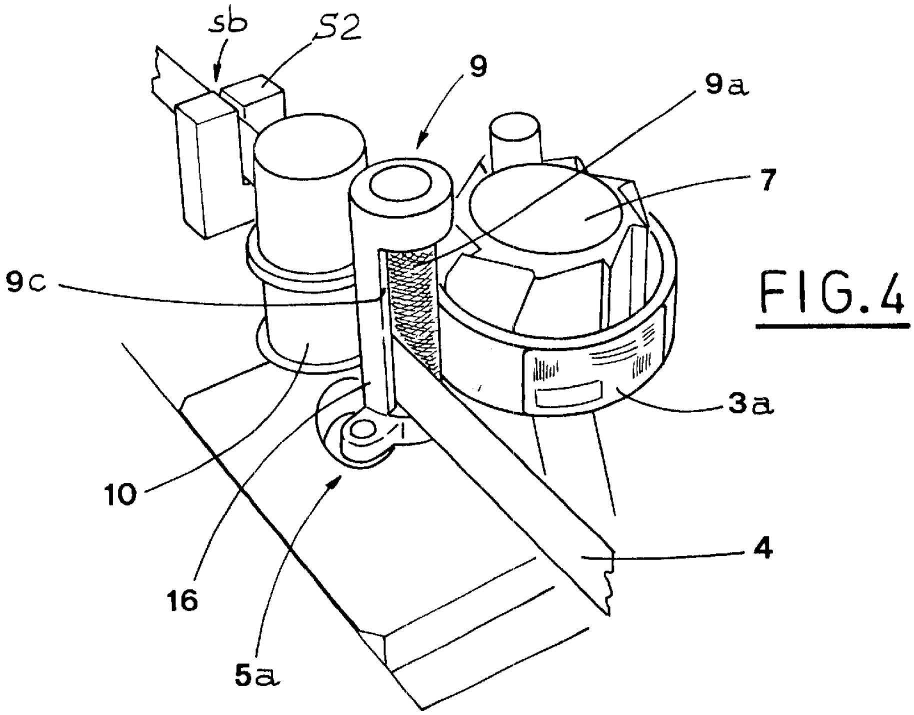
FIG. 4 is a schematic, perspective view of the machine in the first working step of FIG. 2.
Figure 5:
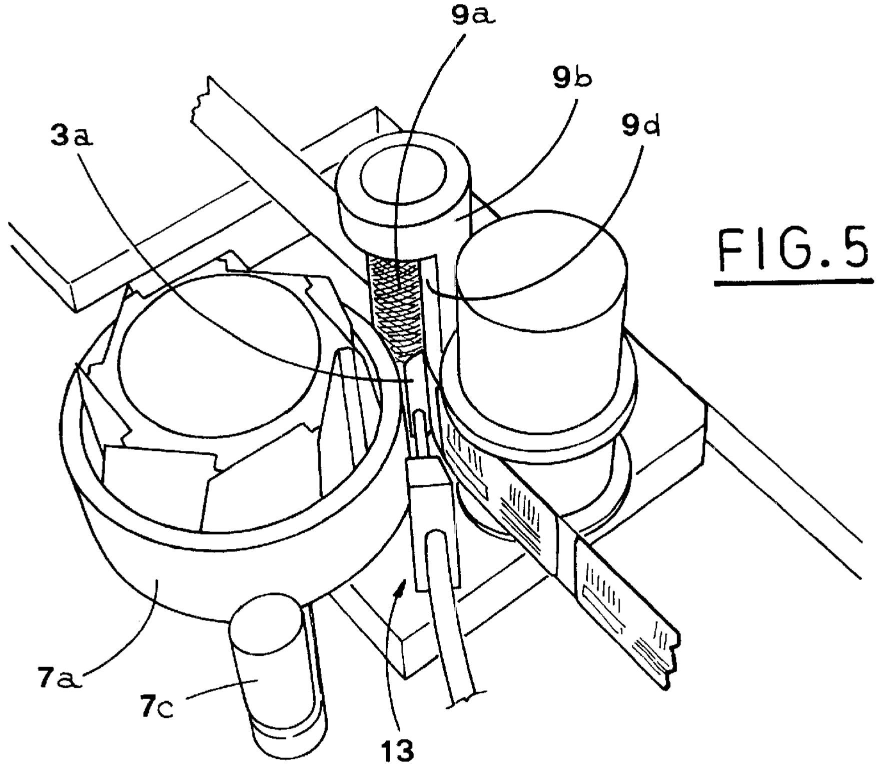
FIG. 5 is a schematic, perspective view of the machine in the configuration of FIG. 3*a*, seen from a point of view different than the one of FIG. 4.

The casing 9*b* has a cylindrical shape and forms a vertical plate 16, which constitutes two edges, upstream edge 9*c* and downstream edge 9*d* (FIGS. 4, 5).

The band 4 passes through the interspace 15 delimited by the knurled roller 9*a* and the vertical plate 16, lying against the knurled roller 9*a*.

The windowed casing 9*b* is operated, on command of the central unit C, by driving means connected to a corresponding actuator 6, situated in the lower part of the carriage 5 and rotatably supported thereby about a vertical axis.

The driving means include substantially a vertical bar, whose lower end is hinged to the shaft 6*a* of the actuator 6 and whose upper end extends protruding from the windowed casing 9*b*.

Near its upper end, the bar engages with an opening 5*a* formed by the carriage 5.

The actuator 6 moves the windowed casing 9*b* from a rest configuration B, in which the cross section of the plate 16 is substantially parallel to the moving direction W and the band 4 is wholly guided by the knurled roller 9*a* and the tightening roller 10, to a working configuration A, in which the cross section of the plate 16 is oriented substantially orthogonal to the direction W and the band 4 is guided in cooperation with the downstream edge 9*d* of the plate 16.

Basically, the collecting group 70 includes an arm 7*b*, which is pivoted to the carriage 5 about a pivot 8 orthogonal to the carriage 5 and which carries a cylindrical supporting structure 7.

The edge of the supporting structure 7, idle on its axis, couples removably, e.g. with interference, with a member 7*a* collecting defective labels 3*a*, which is e.g. a cardboard core.

On the part opposite to the pivot 8, the arm 7*b* forms a hand grip 7*c*.

The arm 7*b* cooperates with elastic means, non shown, situated near the pivot 8.

If there are no external forces applied to the hand grip 7*c*, e.g. provoked by the operator, the elastic means maintain the collecting member 7*a* always in contact with the knurled roller 9*a*, carried by the carriage 5 (FIG. 4).

Means 13 for detaching defective labels 3*a* are situated near the downstream edge 9*d* of the plate 16, in the part included between the tightening roller 10 and the collecting group 70.

The defective labels detaching means 13, e.g. nozzles, are connected in known way with a source of compressed air, on command of the central unit C.

Now, operation of the proposed labels check station 1 will be described, beginning from the configuration, in which the band 4 is unwound from the bobbin 4*a* and the windowed casing 9*b* is in the rest configuration B.

In usual working conditions, the auto adhesive labels 3 carried by the band 4 are first examined by the videocamera 14, which checks contemporarily the bar code and the printing with respect to the information previously set up by the operator.

Afterwards, each label 3, checked by the videocamera 14, is detected by the first sensor S1, which verifies its presence on the band 4, and then, it passes to the proposed checking station 1, where, downstream thereof, the label is detected by the second sensor S2 before being applied to a corresponding article, not shown, e.g. bottle and/or vial.

In normal operation condition, the videocamera 14 confirms the acceptability of each label, which passes in front of the first sensor S1 and through the check station 1 without being withdrawn by the band 4.

Then, the second sensor S2 verifies if the label 3 is present on the band 4 and qualifies it, on command of the central unit C, to be applied on the corresponding bottle and/or vial.

Therefore, if the label is fitted, the band 4 passes through the interspace 15 of the working group 9, guided only by the knurled roller 9*a* and tightening roller 10, since the casing 9*b* is in the rest configuration B and the vertical plate 16 having the cross section substantially parallel to the band 4 movement direction W.

The knurled roller 9*a* and tightening roller 10 are driven into rotation freely by the band 4.

Figure 2:
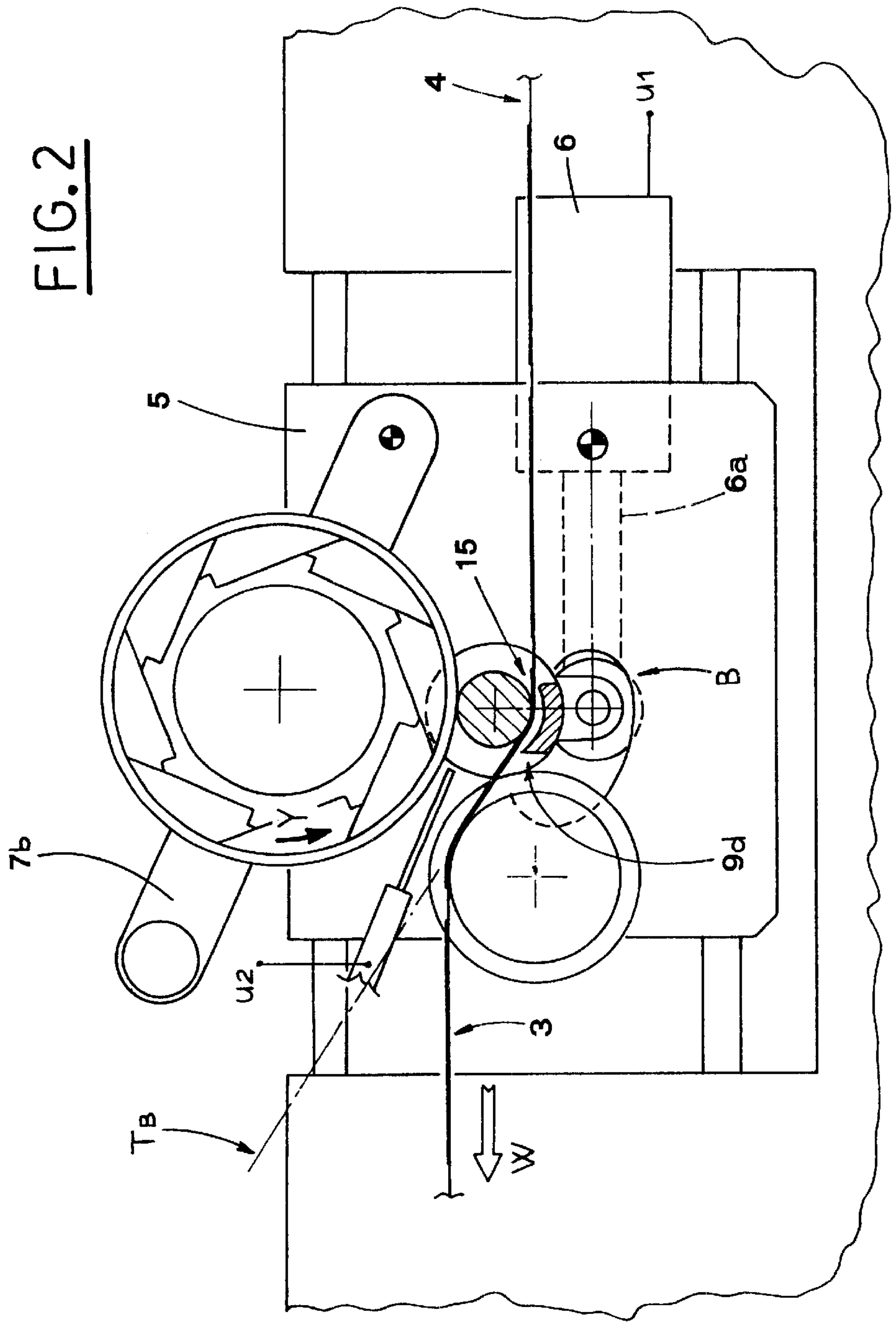
FIG. 2 is a schematic, enlarged, plan view of the proposed station in a first, particularly significant working step.

Consequently, the band 4 passing through the interspace 15 of the working group 9, describes trajectories of a tangent, which varies continuously from an orientation defined by movement direction W, at the station 1 inlet, to a rest orientation "$T_B$", in which the belt touches the knurled roller 9*a*, then again to W direction defined orientation, at the station 1 outlet (FIG. 2).

The dynamic friction factor between the band 4 and the knurled roller 9*a* and the tightening roller 10 is high enough to ensure that the band 4 adheres to the rollers 9*a*, 10.

The rotation imposed to the knurled roller 9*a* drives into rotation the cardboard core 7*a*, which is in contact therewith, in a direction Y, in this case counterclockwise (FIGS. 3*a*, 3*b*), due to the compression action performed on the collecting group 70 by the elastic means situated near the pivot 8.

When the videocamera 14 detects a defective label 3*a*, e.g. with a wrong code or faded printing, the central unit C follows, step by step, the defective label 3*a* through the first sensor S1, which confirms its presence, and the checking station 1, which removes the defective label 3*a* from the belt. Downstream of the station 1, the second sensor S2 verifies the removal of the defective label 3*a*.

If the defective label 3*a* is not removed from the band 4, the central unit C will stop the labeling machine, thus also the band 4.

When a defective label 3*a* is detected, the central unit C operates the actuator 6 is suitable step relation with the passage of the defected label 3*a* near the first sensor S1, so that the shaft 6*a* moves the casing 9*a* from the rest configuration B to the working configuration A.

Therefore, the plate 16 is arranged with its cross section substantially orthogonal to the movement direction W, so as to catch the defected label 3*a* with the downstream edge 9*d*.

Figure 3A:
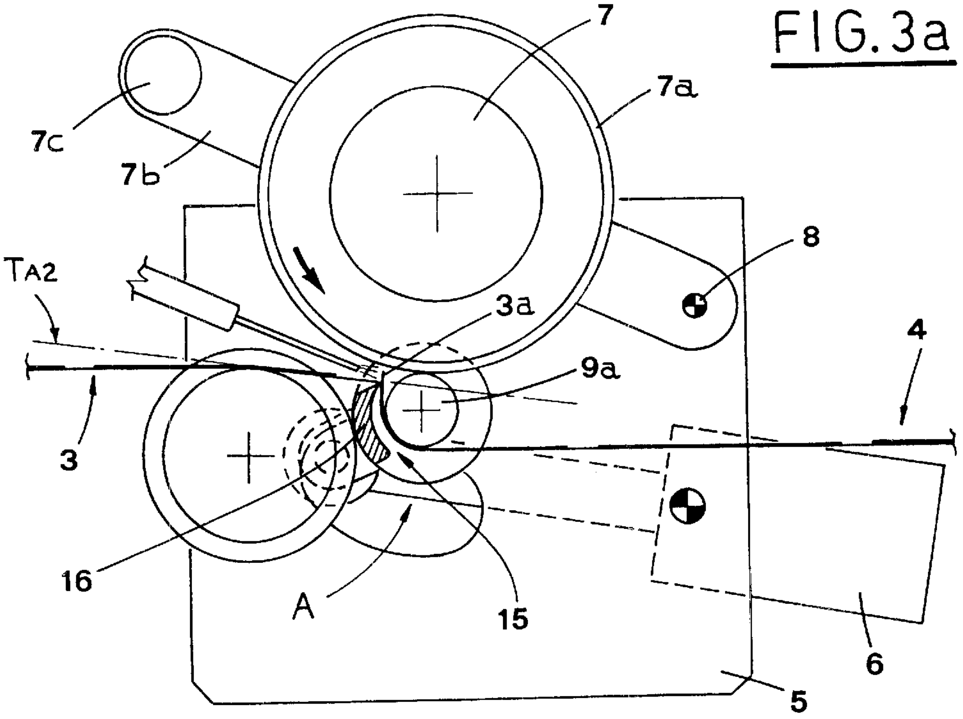
FIGS. 3*a*, 3*b* are corresponding schematic plan views, according to the scale of FIG. 2, of the proposed station in subsequent configurations of a second particularly significant working step.
Figure 3B:
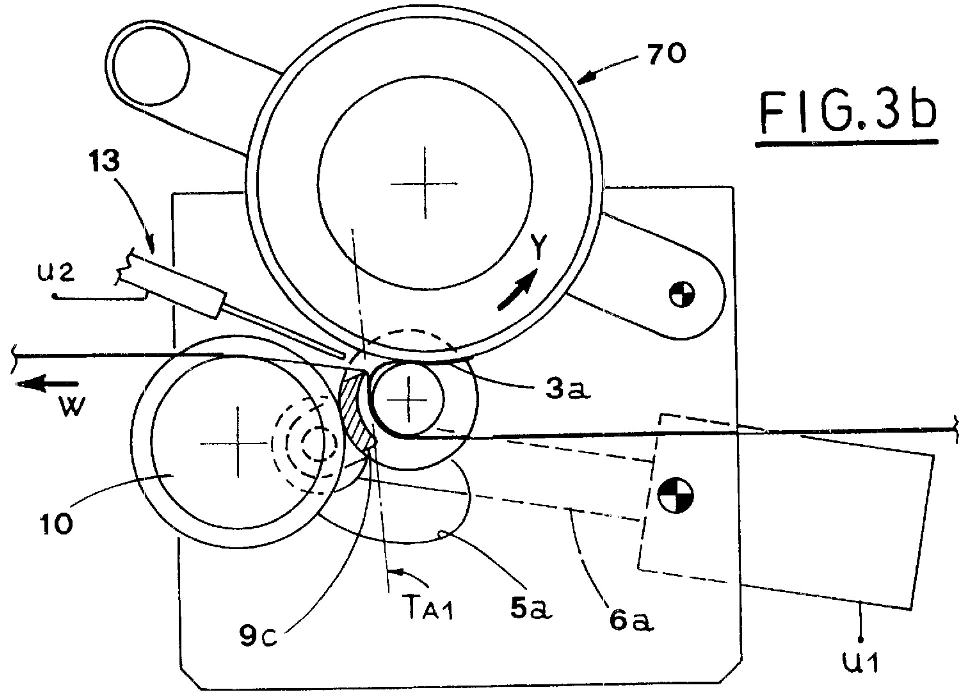

Then, when in the rest configuration A, the band 4 passing through the interspace 15, describes trajectories of strongly discontinuous tangents in the region of the downstream edge 9*d*, where the tangent orientations take working directions, first "$T_{A1}$" and second "$T_{A2}$", respectively upstream and downstream, very different one from another, the downstream edge being the one indicated with 9*d* (FIGS. 3*a*, 3*b*).

The sharp variation of the band 4 trajectory in the region of the edge 9*d* generates a discontinuity point of the relative tangent ($T_{A1} \neq T_{A2}$), thus making the defective label 3*a* detach from the band due to the different rigidity of the band 4 material and the material, from which the defective auto adhesive label 3*a* is made.

Actually, while the band 4 follows a path imposed by the knurled and tightening rollers 9*a* and 10 and the downstream edge 9*d*, the defective label 3*a* remains applied to the band 4 in the whole area of contact with the knurled roller 9*a*, then it detaches therefrom in the region of the downstream edge 9*d*, where the band takes a first working orientation $T_{A1}$, i.e. in the region of the sharp point of the trajectory tangent.

The central unit C operates, in step relation with the casing 9*b* transition to the working configuration A, the connection of the nozzle 13 with the source of compressed air, which is sent to the downstream edge 9*d*, so as to accelerate the detachment of the defective label 3*a* from the band 4, and to facilitate the application thereof to the cardboard core 7*a*.

Actually, the defective label 3*a*, gradually detached from the band 4, is sent to the cardboard core 7*a*, and then fastened thereto due to the compression action performed on the cardboard core 7*a* by the knurled roller 9*a*, which drives it into rotation.

The central unit C commands, in step relation with the defective label 3*a* detachment, the disconnection of the nozzle 13 from the compressed air source and operates the actuator 6, which makes, by the transmission means, the windowed casing 9*b* pass from working configuration A to the rest configuration B.

In this way, the cross section of the plate 16 returns substantially parallel to the band 4 movement direction W downstream of the station 1, thus avoiding the detachment of the subsequent, not defective label 3.

The diameter of the cardboard core increases gradually together with the number of defective labels 3*a* accumulated thereon, against the action of elastic means present in the region of the pivot 8.

When the cardboard core reaches the maximum diameter defined by the operator, it is removed and substituted.

The cardboard core 7*a* is substituted by acting on the hand grip 7*c*, so as to move the arm 7*b* away from the knurled roller 9*a*, normally kept in contact with the cardboard core 7*a* by the elastic means acting in correspondence to the pivot 8.

The maximum diameter of the cardboard core 7*a* can be checked visually or by a photocell, helped by visual and/or acoustic signals.

If the band 4 carries labels 3 of different size, the interspace 15 between the casing 9*b* and the knurled roller 9*a* is sufficiently high to allow bands of different heights to be introduced therein.

The tightening roller 10 and, in case it is necessary, also the collecting member 7*a*, must be substituted at the same time.

To ensure always correct removal of a defective label 3*a*, even when the label size is changed, it is necessary to adjust the carriage 5 position, so as to maintain the correct positioning between the knurled roller 9*a* and the plate 16 formed by the casing 9*b*, as well as to maintain the correct step relation of the passage from the rest configuration A to the working configuration B, and vice versa.

The presence of the nozzle 13, which delivers compressed air in the region of the downstream edge 9*d* of the plate 16, is necessary because of the high speed of the band 4 movement, so as to facilitate the removal of the defective label 3*a*, which is removed automatically in any case because of the change of the trajectory of the band 4 together while the defective label 3*a* is in the region of the downstream edge 9*d*.

The described check station 1 obtains the object of detecting the presence of an auto adhesive defective label and removing it from the carrying belt, so that the rejected bottle and/or vial without the label can be collected and recycled in the machine process.

The economic profit depends on the product contained in the bottle and/or vial and is bigger when the cost of the product contained in the bottle or vial is higher.

The proposed station allows to avoid additional cost of manpower needed to remove the non suitable labels from the relative bottles and/or vials, as well as a strong possibility of confusion about the precise content of the bottle and/or vial.

It is also to be pointed out that the elements of the proposed station are few and simple to manufacture, which results in low production costs.

The above mentioned advantages are obtained by a simple, extremely reliable and functional technical solution, which allows to optimize the working cycle of the labeling machine.

It is understood that what above, has been described as a pure, not limitative example, therefore, possible variants of the invention remain within the protective scope of the present technical solution, as described above and claimed hereinafter.

What is claimed is:

1. A station for checking labels in a labeling machine, said station co-operating with a first sensor, located upstream of the station for checking the presence of said labels, and with a check group, also located upstream for verifying the acceptability of said labels, and with a second sensor, located downstream of said station for checking again the presence of said labels, with said sensors and check group being connected to a station control unit, and with said labels being attached to a band driven upstream and downstream of said station in accordance with a same forward direction, said labels check station further including:

a working group capable of removing damaged labels from said band, said working group including a operative roller, having vertical axis and idling on an axle, supported by a base contained with a clearance within a related cylindrical shaped windowed casing which is freely supported by said axle of said operative roller, said windowed casing featuring at one side a vertical plate having an upstream edge and a downstream edge, said operative roller and vertical plate delimiting an interspace through which said band passes while resting on said operative roller;

a tightening roller, idling on an axis, carried by said base for guiding said belt, said tightening roller co-operating with said working group and being located downstream of said working group with respect to said forward direction of said band;

one collecting group supported by the same base and co-operating with said working group for collecting defective labels removed from said band by said working group;

said windowed casing being operated on command of said control unit, in phase relation with the detection of a defective label, by said check group with the aid of a related actuator means, from a rest configuration, in which the related plate is substantially parallel to said forward direction, with the band completely guided by said operative roller and tightening roller, to a working configuration, in which said plate is substantially perpendicular to said forward direction, with the band engaged by said downstream edge of said plate so as to remove said defective label due to the sharp variation of the tangent of the band trajectory.

2. A station, according to claim 1, wherein said collecting group includes an arm hinged at a pivot perpendicular to said base, said arm carrying a cylindrical supporting structure idling on a related axis and having a defective labels collecting member removably mounted onto a peripheral region, said collecting group cooperating with elastic means situated in the region of said pivot for keeping said defective labels collecting member pushed against said operative roller, when no external forces act on said arm.

3. A station, according to claim 2, including an handgrip fastened to said arm and extending on a side opposite to said pivot.

4. A station, according to claim 2, wherein said collecting member is removably mounted onto said supporting structure as an interference fit, and said collecting member includes a cardboard core.

5. A station, according to claim 1, including detaching means located in a region between said collecting group and tightening roller, near said downstream edge of said plate, said detaching means being capable of facilitating the removal of a defective label from said band, on command of said control unit, in step relation with the shifting of said windowed casing from said rest configuration to said working configuration, said detaching means being supported by said base.

6. A station, according to claim 5, wherein said detaching means include at least one nozzle set in communication, on command of said control unit, with a compressed air source for a selected period of time, said nozzle being oriented radially with respect to said operative roller.

7. A station, according to claim 1, including an opening is made in said base to allow passage of driving means for transmitting a motion from said actuator means to said windowed casing, said actuator means being positioned below said base and rotatably supported by the same base with vertical rotation axis.

8. A station, according to claim 7, wherein said driving means include a substantially vertical bar, having a lower end, hinged to a shaft of said actuator, and an upper end connected to and protruding from said windowed casing, said bar passing through said opening.

9. A station, according to claim 1, wherein said base includes a mobile carriage.

10. A station, according to claim 1 wherein said operative roller is knurled.

* * * * *